(12) United States Patent
Ando

(10) Patent No.: US 12,172,600 B2
(45) Date of Patent: Dec. 24, 2024

(54) VEHICLE CONTROL APPARATUS

(71) Applicant: SUBARU CORPORATION, Tokyo (JP)

(72) Inventor: Yusuke Ando, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 137 days.

(21) Appl. No.: 18/076,735

(22) Filed: Dec. 7, 2022

(65) Prior Publication Data

US 2023/0182682 A1 Jun. 15, 2023

(30) Foreign Application Priority Data

Dec. 14, 2021 (JP) ................... 2021-202551

(51) Int. Cl.
| | |
|---|---|
| *B60R 25/08* | (2006.01) |
| *B60R 25/30* | (2013.01) |
| *B60T 7/04* | (2006.01) |
| *B60T 7/12* | (2006.01) |
| *B60T 13/66* | (2006.01) |
| *B60T 13/68* | (2006.01) |

(Continued)

(52) U.S. Cl.
CPC ............ *B60R 25/083* (2013.01); *B60R 25/30* (2013.01); *B60T 7/042* (2013.01); *B60T 7/12* (2013.01); *B60T 13/662* (2013.01); *B60T 13/686* (2013.01); *B60T 13/745* (2013.01); *B60T 2260/08* (2013.01); *B60T 2270/413* (2013.01); *F16D 2127/06* (2013.01)

(58) Field of Classification Search
None
See application file for complete search history.

(56) References Cited

U.S. PATENT DOCUMENTS 3,617,100 A * 11/1971 Wrigley .................. B60T 11/28
60/591
5,431,487 A * 7/1995 Poricelli ................. B60T 17/16
188/353

(Continued)

FOREIGN PATENT DOCUMENTS

| CN | 101574956 A | * 11/2009 |
|---|---|---|
| CN | 201380823 Y | * 1/2010 |

(Continued)

*Primary Examiner* — Kevin R Steckbauer
(74) *Attorney, Agent, or Firm* — TROUTMAN PEPPER HAMILTON SANDERS LLP

(57) ABSTRACT

The vehicle control apparatus comprises one or more processors, one or more storage media storing a program to be executed by the one or more processors. The program includes one or more instructions. The one or more instructions cause the one or more processors to perform a brake control process in which, after a stroke of a predetermined amount or more is made to a brake pedal by a brake booster to apply brake fluid pressure to the brake mechanism to make the brake fluid pressure in a pressurized state in response to input of a predetermined signal corresponding to detection of theft of the vehicle, the stroke of the brake pedal by the brake booster is cancelled while a first valve disposed in a brake fluid pressure circuit is kept at a closed state to keep the pressurized state of the brake fluid pressure applied to the brake mechanism.

16 Claims, 8 Drawing Sheets

(51) Int. Cl.
  *B60T 13/74*   (2006.01)
  *F16D 127/06*   (2012.01)

(56) References Cited

U.S. PATENT DOCUMENTS

| | | | | |
|---|---|---|---|---|
| 5,477,939 | A * | 12/1995 | Childress | B60T 17/16 |
| | | | | 188/353 |
| 6,007,160 | A * | 12/1999 | Lubbers | B60T 7/042 |
| | | | | 303/114.1 |
| 6,149,248 | A * | 11/2000 | Lubbers | B60T 7/042 |
| | | | | 303/114.1 |
| 7,646,286 | B2 * | 1/2010 | Harumoto | B60R 25/04 |
| | | | | 340/425.5 |
| 9,925,968 | B2 * | 3/2018 | Cann | B60T 13/745 |
| 10,160,430 | B2 * | 12/2018 | Svensson | B60T 8/17 |
| 2006/0214779 | A1 * | 9/2006 | Harumoto | B60R 25/04 |
| | | | | 340/426.11 |
| 2008/0174173 | A1 * | 7/2008 | Kokubo | B60T 13/686 |
| | | | | 303/116.1 |
| 2011/0162920 | A1 * | 7/2011 | Gal | B60T 7/042 |
| | | | | 188/110 |
| 2016/0339890 | A1 * | 11/2016 | Cann | B60T 13/745 |
| 2023/0034103 | A1 * | 2/2023 | Sasaki | B60T 13/146 |
| 2023/0182681 | A1 * | 6/2023 | Ando | B60T 1/10 |
| | | | | 701/70 |
| 2023/0182682 | A1 * | 6/2023 | Ando | B60T 13/745 |
| | | | | 701/70 |
| 2023/0182738 | A1 * | 6/2023 | Ando | B60W 10/188 |
| | | | | 701/70 |
| 2023/0191907 | A1 * | 6/2023 | Homma | E05B 81/56 |
| | | | | 701/70 |

FOREIGN PATENT DOCUMENTS

| | | | | | |
|---|---|---|---|---|---|
| CN | 101574956 | B | * | 6/2011 | |
| CN | 103303275 | A | * | 9/2013 | |
| CN | 103318132 | A | * | 9/2013 | |
| CN | 103303275 | B | * | 5/2015 | |
| CN | 103318132 | B | * | 9/2015 | |
| JP | 2006-264471 | A | | 10/2006 | |
| WO | WO-9510431 | A1 | * | 5/1995 | ........... B60R 25/018 |
| WO | WO-9930938 | A1 | * | 6/1999 | ............. B60R 25/08 |
| WO | WO-2019237143 | A1 | * | 12/2019 | ............. B60R 25/08 |

* cited by examiner

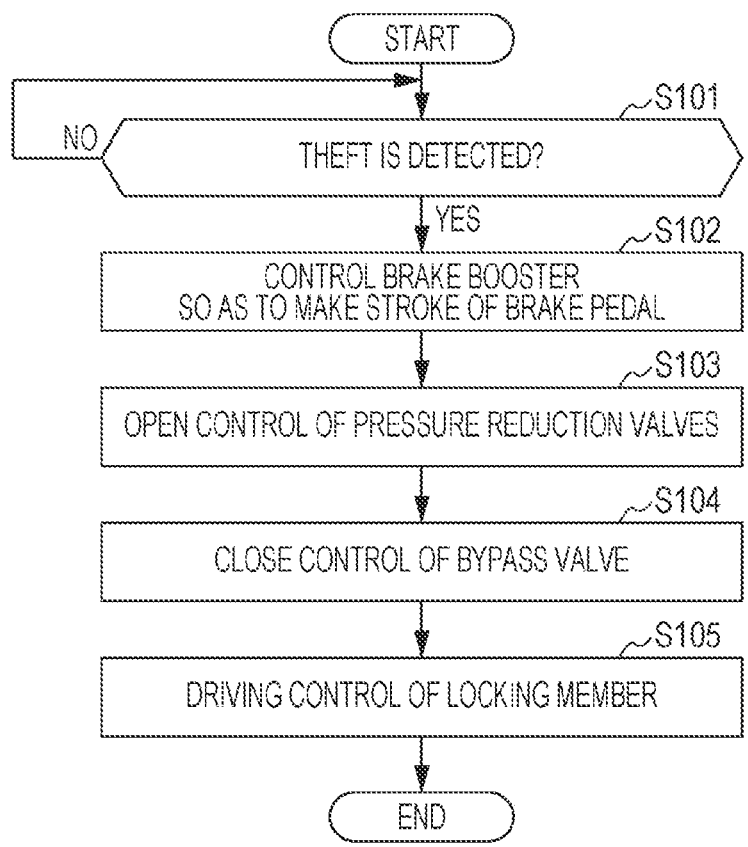

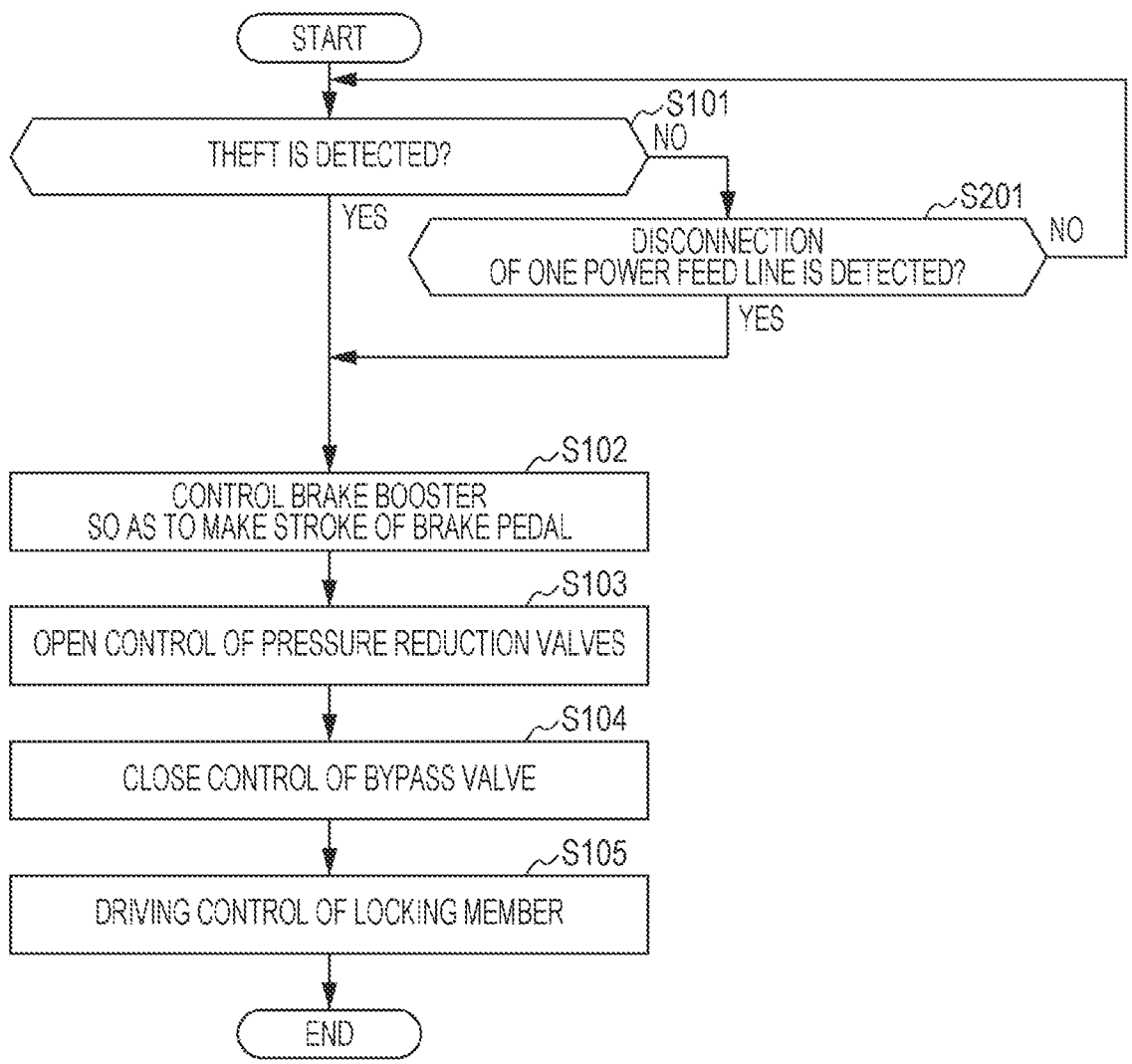

VEHICLE CONTROL APPARATUS

CROSS-REFERENCE TO RELATED APPLICATION

The present application claims priority from Japanese Patent Application No. 2021-202551 filed on Dec. 14, 2021, the entire contents of which are hereby incorporated by reference.

BACKGROUND

The disclosure relates to a vehicle control apparatus that controls a vehicle including brake mechanisms. In particular, the disclosure relates to a technique to prevent theft of a vehicle.

Japanese Unexamined Patent Application Publication No. 2006-264471 discloses a technique to stop a vehicle by applying the brake if it is determined that the vehicle is in a theft state.

SUMMARY

An aspect of the disclosure provides a vehicle control apparatus for a vehicle. The vehicle includes a brake mechanism. The vehicle control apparatus includes one or more processors and one or more storage media. The one or more storage media stores a program to be executed by the one or more processors. The program comprises one or more instructions. The one or more instruction cause the one or more processors to perform a brake control process in which, after a stroke of a predetermined amount or more is made to a brake pedal by a brake booster to apply brake fluid pressure to the brake mechanism to make the brake fluid pressure in a pressurized state in response to input of a predetermined signal corresponding to detection of theft of the vehicle, the stroke of the brake pedal by the brake booster is cancelled while a first valve disposed in a brake fluid pressure circuit is kept at a closed state to keep the pressurized state of the brake fluid pressure applied to the brake mechanism.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

FIG. 7 is a flowchart illustrating an example of a specific processing process for realizing theft prevention control according to the embodiment;

FIG. 9 is a flowchart illustrating an example of a processing process in another example of the embodiment.

DETAILED DESCRIPTION

Setting a brake hold state in response to detection of theft of a vehicle is effective to prevent taking-away of the vehicle by a thief. However, this leads the thief who notices activation of theft prevention control.

In order to resolve the above problem, it is desirable to reduce the motivation of the thief to take away the vehicle while making it difficult for the thief to notice the activation of the theft prevention control to improve the effect of preventing the theft.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
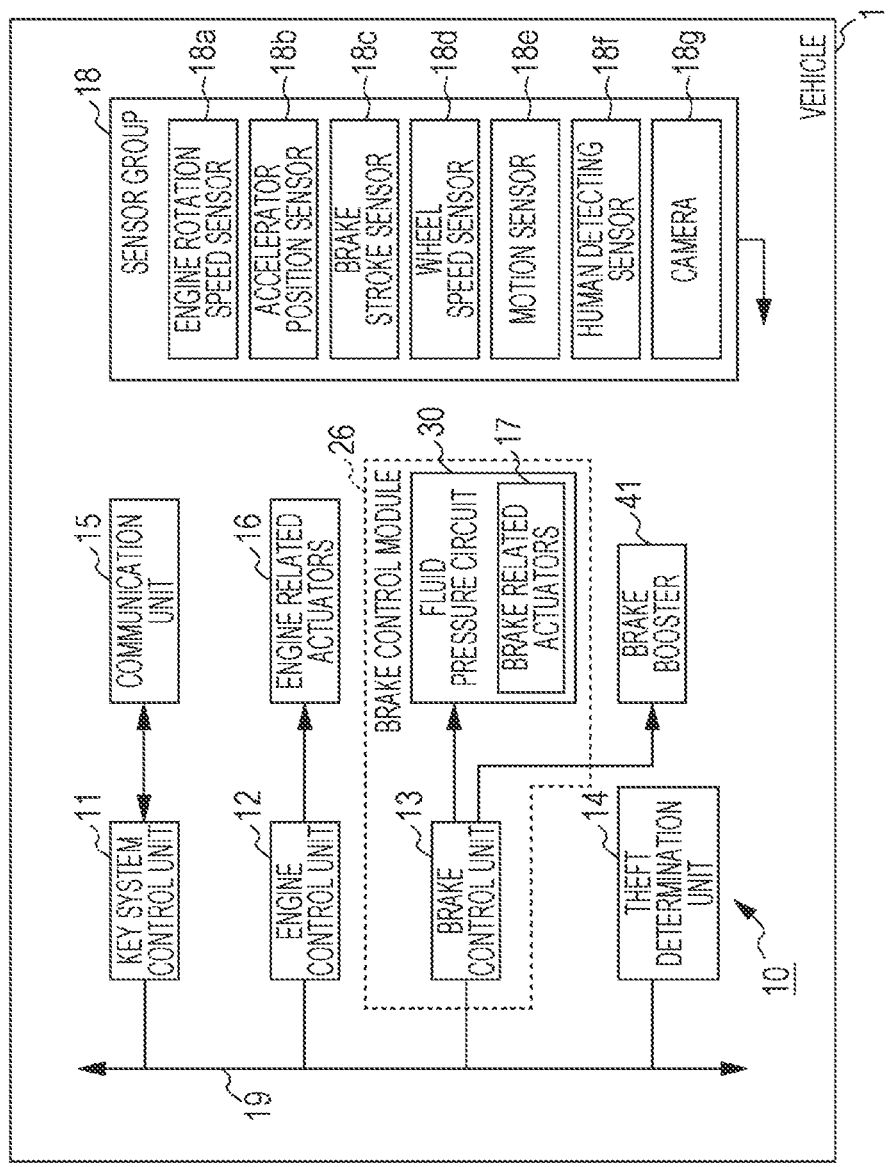
FIG. 1 is a block diagram schematically illustrating the configuration of a vehicle control apparatus according to an embodiment.

FIG. 1 is a block diagram schematically illustrating the configuration of a vehicle control apparatus 10 according to an embodiment of the disclosure.

The vehicle control apparatus 10 is provided in a vehicle 1. The vehicle 1 is, for example, a four-wheel automobile, which is an engine car having an engine as a driving source of the wheels, in the present embodiment. In the following description, among the four wheels of the vehicle 1, the front wheels are represented as wheels 2 and the rear wheels are represented as wheels 3. When the left and right wheels are to be discriminated, the right front wheel is denoted by a wheel 2R, the left front wheel is denoted by a wheel 2L, the right rear wheel is denoted by a wheel 3R, and the left rear wheel is denoted by a wheel 3L.

The vehicle 1 includes a brake mechanism 20 for each wheel although the brake mechanisms 20 are not illustrated in FIG. 1. The configuration of the brake mechanisms 20, a fluid pressure circuit 30 for driving the brake mechanisms 20, and so on in the vehicle 1 will be described in detail below.

As illustrated in FIG. 1, the vehicle control apparatus 10 includes a key system control unit 11, an engine control unit 12, a brake control unit 13, a theft determination unit 14, a communication unit 15, engine related actuators 16, brake related actuators 17, a sensor group 18, a bus 19, the fluid pressure circuit 30, and a brake booster 41.

The key system control unit 11, the engine control unit 12, the brake control unit 13, and the theft determination unit 14 each include, for example, a processor, such as a central processing unit (CPU), and storage media including a read only memory (ROM) and a random access memory (RAM).

Operation programs for the key system control unit 11, the engine control unit 12, the brake control unit 13, and the theft determination unit 14 are stored in the respective ROMs, and the operation programs stored in the ROMs are decomposed in the respective RAMs. The respective RAMs are also used for temporary storage of data used by the key system control unit 11, the engine control unit 12, the brake control unit 13, and the theft determination unit 14 for processing.

The key system control unit 11, the engine control unit 12, the brake control unit 13, and the theft determination unit 14 are connected to each other via the bus 19 supporting, for example, controller area network (CAN) communication to enable mutual data communication.

The sensor group 18 collectively indicates various sensors provided in the vehicle 1. The sensors in the sensor group 18 include, for example, an engine rotation speed sensor 18a that detects the rotation speed of the engine, an accelerator position sensor 18b that detects the degree of depression of an accelerator pedal as a manipulated variable of the accelerator, and a brake stroke sensor 18c that detects the degree of depression of a brake pedal 25 provided in the vehicle 1 as the amount of stroke.

The sensors in the sensor group 18 also include a wheel speed sensor 18d that detects the number of revolutions of the wheels, a motion sensor 18e, such as an acceleration sensor or an angular velocity sensor, which detects a motion of the vehicle 1, a human detecting sensor 18f that detects a motion of a person in vehicle interior or outside the vehicle with radiation of ultrasonic waves or laser beams, and a camera 18g that captures an image of the vehicle interior and an image outside the vehicle, and so on.

The communication unit 15 performs communication with a mobile terminal device that accepts input operations to lock and unlock a door lock of the vehicle 1. The mobile terminal device serves as, for example, a smart key. In this example, identification information about the mobile terminal device is stored in the mobile terminal device.

The key system control unit 11 compares the identification information received from the mobile terminal device by the communication unit 15 with identification information that is registered in advance to perform an authentication process to determine whether the identification information received from the mobile terminal device coincides with the identification information that is registered in advance. In response to a request to unlock the door lock, the key system control unit 11 unlocks the door lock if the authentication is established in the authentication process.

In addition, the key system control unit 11 supplies an engine start permission signal to the engine control unit 12 under the condition of the establishment of the authentication.

Furthermore, if the key system control unit 11 detects that the authentication process is illegally performed through rewriting of the registered identification information or the like, the key system control unit 11 supplies an illegality detection signal indicating that the authentication process is illegally performed to the theft determination unit 14.

The engine control unit 12 controls various actuators provided as the engine related actuators 16 based on a detection signal from a certain senor in the sensor group 18, operation input information with an operator, and so on. The various actuators concerning driving of the engine, such as a throttle actuator that drives a throttle valve and an injector that performs fuel injection, are provided as the engine related actuators 16.

For example, the engine control unit 12 performs start-stop control of the engine in response to an operation with an ignition switch or the like. At this time, the engine control unit 12 performs the start control of the engine under the condition that the engine start permission signal is received from the key system control unit 11. In addition, the engine control unit 12 controls a fuel injection timing, a fuel injection pulse width, the position of the throttle, and so on based on the detection signals from the engine rotation speed sensor 18a, the accelerator position sensor 18b, and so on.

The brake control unit 13 controls various actuators provided as the brake related actuators 17 and the brake booster 41 based on the detection signal from a certain sensor in the sensor group 18, the operation input information with the operator, and so on.

Figure 2:
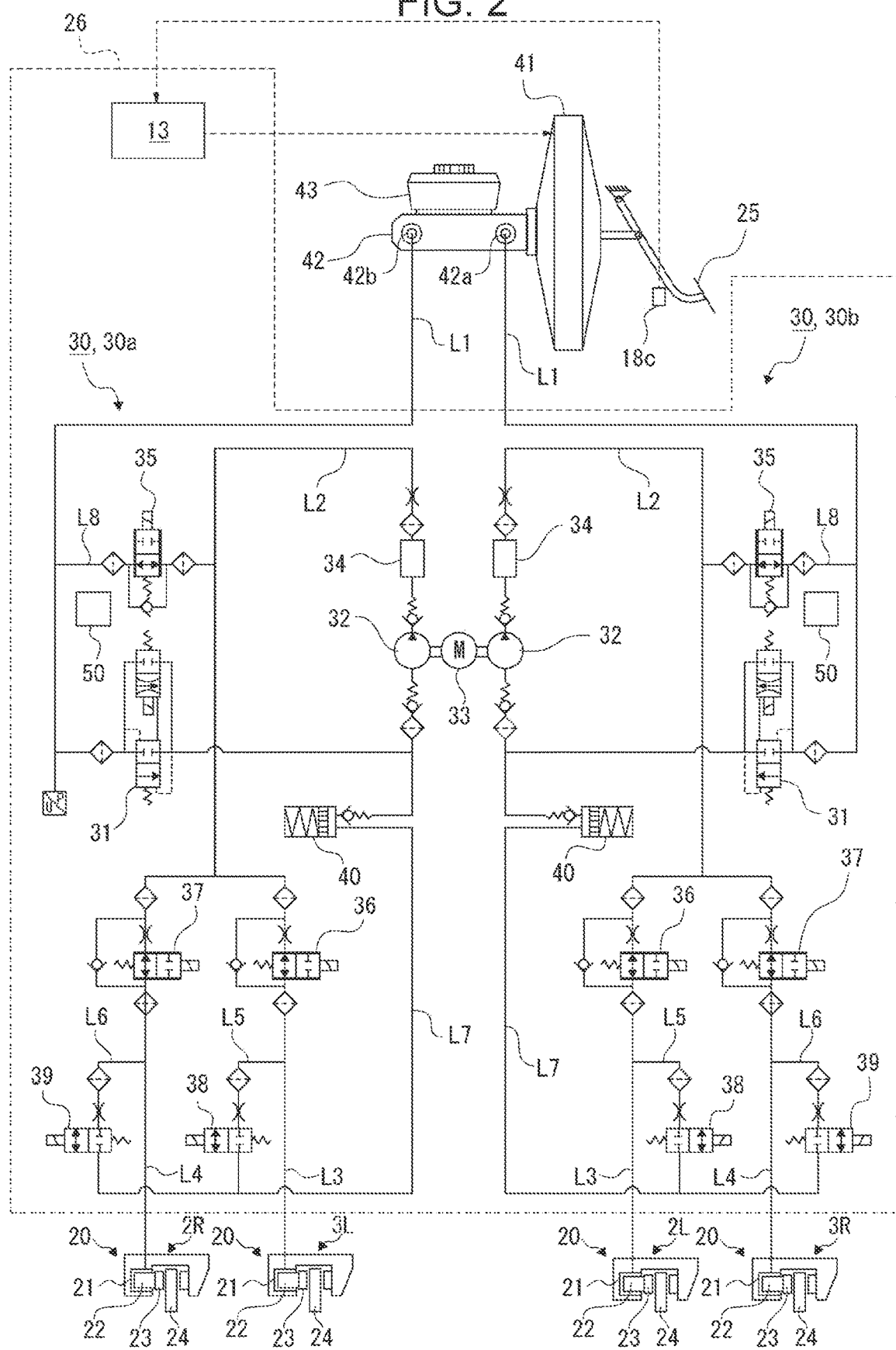
FIG. 2 illustrates an example of the configuration of a brake system provided in the vehicle control apparatus according to the embodiment.

The brake related actuators 17 include the various actuators for control of brake fluid pressure, such as gate-in valves 31, an electric motor 33, and bypass valves 35 provided in the fluid pressure circuit 30 for brake fluid, which are illustrated in FIG. 2 described below.

For example, the brake control unit 13 calculates the slip ratio of the wheels based on information about the wheel speed detected by the wheel speed sensor 18d and information about the vehicle body speed estimated from the information about the wheel speed and controls the brake related actuators 17 based on the information about the slip ratio to realize antilock braking system (ABS) control. In addition, the brake control unit 13 realizes electronic stability program (ESP) control under the control of the brake related actuators 17.

In particular, the brake control unit 13 in the present embodiment performs a brake control process for theft prevention including control of the brake booster 41 in response to detection of theft. The brake control process will be described in detail below.

In the vehicle control apparatus 10 in this example, the brake control unit 13 is composed of a module in which the brake control unit 13 is integrally formed to the fluid pressure circuit 30 including the brake related actuators 17. The module in which the brake control unit 13 is integrally formed to the fluid pressure circuit 30 (including the brake related actuators 17) is herein referred to as a "brake control module 26."

The brake control system may be divided into a module including a processor as the brake control unit 13 and a module including the fluid pressure circuit 30. Although the former module may be provided in the vehicle interior and the latter module may be provided in an engine room in the above case, a configuration is adopted in this example in which the brake control module 26 to which the processor as the brake control unit 13 is integrally formed is disposed in the engine room.

The theft determination unit 14 performs theft determination of the vehicle 1 based on the detection signal from a certain sensor in the sensor group 18 and the illegality detection signal from the key system control unit 11. The theft determination is performed as determination of whether an act of stealing for the vehicle 1 is detected. The act of stealing here widely means an act of the thief to steal the vehicle 1.

In the theft determination unit 14, the theft determination is capable of being performed based on, for example, the detection signal by the motion sensor 18e or the human detecting sensor 18*f*, the image captured by the camera 18*g*, the illegality detection signal from the key system control unit 11, and so on.

For example, when the thief attempts to steal the vehicle 1 using a specific method, a case may be considered in which the vehicle 1 exhibits a specific motion, for example, in which the vehicle 1 vibrates on a specific cycle or in a specific direction in response to the motion of the thief. In such a case, determination of whether the motion of the vehicle 1, which is estimated from the detection signal by the motion sensor 18*e*, corresponds to the specific motion as determination of whether one condition, among multiple conditions of the act of stealing, is met.

Alternatively, the fact that a person other than the person, such as the owner of the vehicle 1, who is registered for the vehicle 1 in advance gets inside the driver's seat of the vehicle 1 to attempt to drive the vehicle 1 may be defined as one condition of the conditions of the act of stealing. In such a case, the detection signal by the human detecting sensor 18*f* or the image captured by the camera 18*g* may be used for the theft determination.

In addition, the theft determination may be simply performed as determination of whether the illegality detection signal is supplied from the key system control unit 11.

Various methods for the theft determination are considered and the method for the theft determination is not limited to a specific method.

In the theft determination, the detection signals by multiple sensors may be used. The theft determination may be performed as determination of whether part or all of the multiple conditions are met.

If the theft determination unit 14 determines that the vehicle 1 is in a theft state in the theft determination (that is, the theft determination unit 14 detects the act of stealing), the theft determination unit 14 supplies a theft detection signal indicating that the vehicle 1 is in the theft state to the brake control unit 13.

FIG. 2 illustrates an example of the configuration of a brake system provided in the vehicle control apparatus 10.

The brake system in the vehicle control apparatus 10 includes the brake mechanisms 20, the brake pedal 25, the brake stroke sensor 18*c*, the brake booster 41, a master cylinder 42, a reservoir tank 43, and the brake control module 26, as illustrated in FIG. 2.

The brake pedal 25 is coupled to the brake booster 41.

The brake stroke sensor 18*c* detects the amount of stroke of the brake pedal 25 and supplies the detection signal to the brake control unit 13.

The brake booster 41 is composed as an electric brake booster. The brake booster 41 moves a primary piston of the master cylinder 42 under the control of the brake control unit 13. For example, the brake booster 41 moves the primary piston by a movement amount corresponding to the degree of depression of the brake pedal 25. The brake booster 41 is mechanically connected to the brake pedal 25 so that the brake fluid pressure is capable of being supplied to the brake mechanisms 20 in response to an operation of the brake pedal 25, for example, in case of emergency.

The master cylinder 42 is, for example, a tandem master cylinder. The master cylinder 42 is connected to the reservoir tank 43 and is connected to the brake mechanisms 20 via the fluid pressure circuit 30. The master cylinder 42 generates the brake fluid pressure to apply the brake fluid pressure to the brake mechanisms 20 via the fluid pressure circuit 30.

Each of the brake mechanisms 20 is composed of, for example, a disk brake mechanism and is provided in each of the wheels 2R and 2L, which are the front wheels, and the wheels 3R and 3L, which are the rear wheels.

As illustrated in FIG. 2, the brake mechanisms 20 each include a brake caliper 21, a brake piston 22, a brake pad 23, and a brake rotor 24. The brake caliper 21 has a fluid pressure chamber (not illustrated in FIG. 2) receiving the brake fluid and the brake fluid pressure is applied to the brake caliper 21 via the fluid pressure circuit 30. The brake piston 22 is housed in the brake caliper 21 so as to be capable of sliding and moves (slides) in the brake caliper 21 with the brake fluid pressure applied to the brake caliper 21 (the fluid pressure chamber described above).

The brake pad 23 is connected with a tip of the brake piston 22 and is pressed onto the brake rotor 24, which is rotated with the wheels, in response to movement of the brake piston 22 with the brake fluid pressure. The brake mechanisms 20 brake the vehicle 1 (the wheels) in the above manner.

The fluid pressure circuit 30 is composed of two systems: a first fluid pressure circuit 30*a* and a second fluid pressure circuit 30*b*. The fluid pressure circuit 30 supports cross piping in this example. The first fluid pressure circuit 30*a* is connected to the brake mechanisms 20 provided in the wheels 2R and 3L and the second fluid pressure circuit 30*b* is connected to the brake mechanisms 20 provided in the wheels 2L and 3R.

Since the first fluid pressure circuit 30*a* has the same configuration as that of the second fluid pressure circuit 30*b*, the same reference numerals are commonly used in the following description. Although terms of "upstream" and "downstream" of the brake fluid are used for the fluid pressure circuit 30, these mean the upper stream and the down stream when the master cylinder 42 is considered as a fluid source of the brake fluid.

The master cylinder 42 has a supply and exhaust port 42*a* and a supply and exhaust port 42*b*. A first flow path L1 is connected with each of the supply and exhaust port 42*a* and the supply and exhaust port 42*b*. In other words, an upstream end of the first flow path L1 is connected with the master cylinder 42 (the supply and exhaust port 42*a* and the supply and exhaust port 42*b*). The gate-in valve 31 is provided on the first flow path L1, and a downstream end of the first flow path L1 is connected with the node between a downstream end of a seventh flow path L7 described below and an upstream end of a second flow path L2 described below.

A low-pressure chamber 40 is provided on the seventh flow path L7, and a hydraulic pump 32 and a pulsation pressure reducing mechanism 34 are provided on the second flow path L2.

An upstream end of an eighth flow path L8 is connected with the first flow path L1. For example, the upstream end of the eighth flow path L8 is connected with a portion upstream of the gate-in valve 31 on the first flow path L1. The bypass valve 35 is provided on the eighth flow path L8. A downstream end of the eighth flow path L8 is connected with a portion downstream of the hydraulic pump 32 and the pulsation pressure reducing mechanism 34 on the second flow path L2.

A downstream end of the second flow path L2 is branched into a third flow path L3 and a fourth flow path L4.

A pressure valve 36 is provided on the third flow path L3 and a pressure valve 37 is provided on the fourth flow path L4.

In this example of the cross piping, downstream ends of the third flow paths L3 are connected with the brake mechanisms 20 (the brake calipers 21) of the left wheel 2L and the left wheel 3L and downstream ends of the fourth flow paths L4 are connected with the brake mechanisms 20 (the brake calipers 21) of the right wheel 2R and the right wheel 3R.

Each of the third flow path L3 and the fourth flow path L4 may be connected with the brake mechanism 20 of any of the wheels. For example, in the case of independent piping in the left-and-right direction, for example, the first fluid pressure circuit 30a is provided for the front wheels side and the second fluid pressure circuit 30b is provided for the rear wheels side. The third flow path L3 and the fourth flow path L4 of the first fluid pressure circuit 30a may be respectively connected with the brake mechanisms 20 of the wheel 2R and the wheel 2L, and the third flow path L3 and the fourth flow path L4 of the second fluid pressure circuit 30b may be respectively connected with the brake mechanisms 20 of the wheel 3R and the wheel 3L.

An upstream end of a fifth flow path L5 is connected with a portion that is upstream of the downstream end connected to the brake mechanism 20 and that is downstream of the pressure valve 36 on the third flow path L3. An upstream end of a sixth flow path L6 is connected with a portion that is upstream of the downstream end connected to the brake mechanism 20 and that is downstream of the pressure valve 37 on the fourth flow path L4.

A pressure reduction valve 38 and a pressure reduction valve 39 are provided on the fifth flow path L5 and the sixth flow path L6, respectively. The seventh flow path L7 is connected with downstream ends of the fifth flow path L5 and the sixth flow path L6.

On the seventh flow path L7, the low-pressure chamber 40 is provided in a portion downstream of the node between the seventh flow path L7 and the downstream end of the fifth flow path L5 and the node between the seventh flow path L7 and the downstream end of the sixth flow path L6.

The low-pressure chamber 40 is provided to temporarily accumulate the brake fluid.

On the second flow path L2, the hydraulic pump 32 and the pulsation pressure reducing mechanism 34 are provided between the node between the second flow path L2 and the downstream end of the eighth flow path L8 and the node between the second flow path L2, and the downstream end of the seventh flow path L7 and the downstream end of the first flow path L1.

The hydraulic pumps 32 in the first fluid pressure circuit 30a and the second fluid pressure circuit 30b are driven with the common electric motor 33.

The pulsation pressure reducing mechanism 34 attenuates pulsation of the brake fluid injected from the hydraulic pump 32.

In this example, the gate-in valve 31, the pressure reduction valve 38, and the pressure reduction valve 39 are normally-closed electromagnetic solenoid valves, which close in a de-energized state and open in an energized state. In contrast, the bypass valve 35, the pressure valve 36, the pressure valve 37 are normally-open electromagnetic solenoid valves, which open in the de-energized state and close in the energized state.

The gate-in valve 31, the electric motor 33, the bypass valve 35, the pressure valve 36, the pressure valve 37, the pressure reduction valve 38, and the pressure reduction valve 39 are controlled by the brake control unit 13.

A locking unit 50 is provided for the bypass valve 35 in each of the first fluid pressure circuit 30a and the second fluid pressure circuit 30b in this example. The locking unit 50 will be described in detail below.

In a state in which the brake fluid pressure control, such as the ABS control or the ESP control, by the brake control unit 13 is not performed, the gate-in valve 31, the pressure reduction valve 38, the pressure reduction valve 39, which are the normally-closed valves, are in a closed state and the bypass valve 35, the pressure valve 36, and the pressure valve 37, which are the normally-open valves, are in an open state. The electric motor 33 is not driven and the hydraulic pump 32 is stopped.

If a driver who drives the vehicle 1 depresses the brake pedal 25 in the state in which the brake control unit 13 does not perform the brake fluid pressure control, such as the ABS control, the brake fluid pressure generated by the master cylinder 42 passes through the first flow path L1, the eighth flow path L8, and the second flow path L2, is branched into the third flow path L3 and the fourth flow path L4, and is supplied to the brake mechanisms 20. The brake mechanisms 20 brake the wheels with the brake fluid pressure.

In contrast, during the brake fluid pressure control, such as the ABS control or the ESP control, the brake control unit 13 performs control so as to set the gate-in valve 31, which is the normally-closed valve, to the open state and set the bypass valve 35, which is the normally-open valve, to the closed state. Since the pressure valves 36 and 37 are the normally-open valves and the pressure reduction valves 38 and 39 are the normally-closed valves, as described above, the gate-in valve 31, the pressure valve 36, and the pressure valve 37 are in the open state and the bypass valve 35, the pressure reduction valve 38, and the pressure reduction valve 39 are in the closed state through the brake fluid pressure control.

The brake control unit 13 drives the electric motor 33 during the brake fluid pressure control, such as the ABS control or the ESP control.

Through the brake fluid pressure control, the hydraulic pump 32 is rotated in response to the driving by the electric motor 33 and the brake fluid accumulated in the reservoir tank 43 is suck into the first flow path L1 via the master cylinder 42, independent of the operation with the brake pedal 25.

The brake fluid suck into the first flow path L1 passes through the second flow path L2 via the gate-in valve 31, is branched into the third flow path L3 and the fourth flow path L4, and is supplied to the brake mechanisms 20. The brake mechanisms 20 brake the wheels with the applied brake fluid pressure.

When the fluid pressure to be applied to the brake mechanisms 20 is to be reduced, for example, when brake force is to be temporarily decreased in the ABS control, the brake control unit 13 controls the bypass valve 35 and the pressure valves 36 and 37 so as to be in the closed state and controls the pressure reduction valves 38 and 39 so as to be in the open state. The open state of the gate-in valve 31 (the normally-closed valve) is kept at this time.

As a result, the gate-in valve 31 and the pressure reduction valves 38 and 39 are in the open state and the bypass valve 35 and the pressure valves 36 and 37 are in the closed state.

The brake control unit 13 continues the driven state of the electric motor 33.

In this case, the hydraulic pump 32 is rotated in response to the driving by the electric motor 33 and the brake fluid in the brake mechanisms 20 (the brake calipers 21) flows into the seventh flow path L7 from the third flow path L3 and the fourth flow path L4 through the fifth flow path L5 and the sixth flow path L6, respectively. The brake fluid flowing into the seventh flow path L7 is accumulated in the low-pressure chamber 40.

The brake fluid pressure in the brake mechanisms 20 is reduced in the above manner to relieve the braking of the wheels by the brake mechanisms 20.

The brake control unit 13 performs the brake control for theft prevention in the present embodiment.

Figure 3:
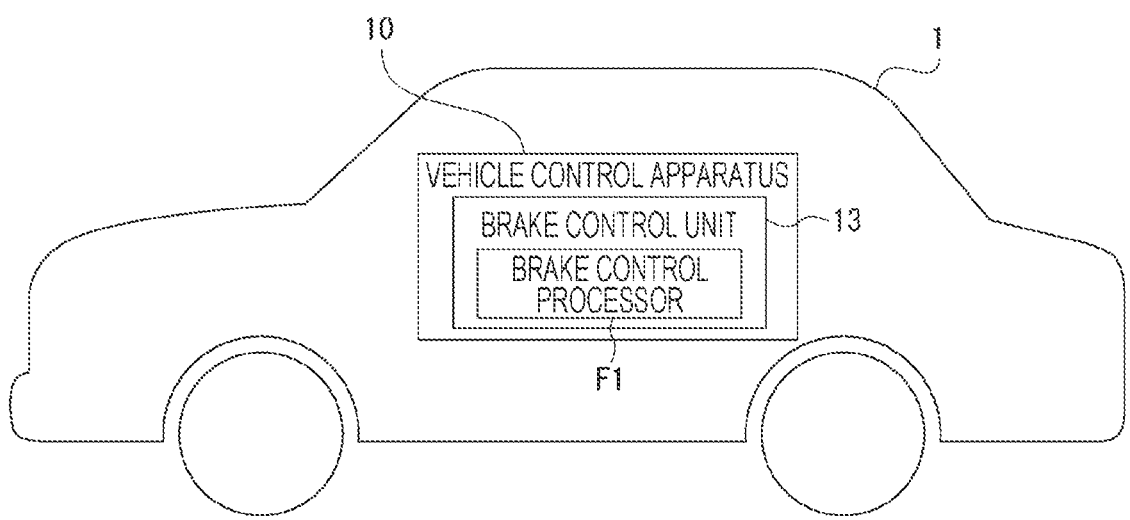
FIG. 3 is a functional block diagram illustrating a function according to the embodiment.

FIG. 3 is a functional block diagram illustrating a function according to an embodiment of the brake control unit 13 provided in the vehicle control apparatus 10 in the vehicle 1.

As illustrated in FIG. 3, the brake control unit 13 has a function as a brake control processor F1. The brake control processor F1 performs the following process as the brake control process for theft prevention. The brake control processor F1 performs a process in which, after a stroke of a predetermined amount or more is made to the brake pedal 25 by the brake booster 41 to apply the brake fluid pressure to the brake mechanisms 20 in response to input of a certain signal corresponding to detection of theft of the vehicle 1, the stroke of the brake pedal 25 by the brake booster 41 is cancelled while keeping a fluid pressure applied state to the brake mechanisms 20 by keeping a first valve disposed in the fluid pressure circuit 30, for example, the bypass valve 35 at the closed state.

In one example, the brake control unit 13 starts the brake control process described above in response to input of the theft detection signal, which is output as a signal to indicate that the theft is detected when the theft determination unit 14 detects the theft through the theft determination described above.

As described above, in the brake control process, a stroke of a predetermined amount or more is made to the brake pedal 25 by the brake booster 41 to apply the brake fluid pressure to the brake mechanisms 20. In this example, a full-stroke is made, that is, the stroke is made until the brake pedal 25 reaches the bottom.

Then, the bypass valve 35 disposed in the fluid pressure circuit 30 is kept at the closed state to keep the fluid pressure applied state to the brake mechanisms 20. In the state in which the fluid pressure applied state to the brake mechanisms 20 is kept, the stroke of the brake pedal 25 by the brake booster 41 is cancelled.

Through the above control, the vehicle 1 is in the brake hold state and reaction force against pedal force of the brake pedal 25 is reduced in response to detection of theft of the vehicle 1. In other words, the brake pedal 25 does not work well and the brakes are not so sharp.

The state in which the reaction force against the pedal force of the brake pedal 25 is reduced may lead false recognition of brake failure by the thief and may reduce the motivation of the thief to take away the vehicle 1 while making it difficult for the thief to notice activation of the theft prevention control to improve the effect of preventing the theft. In addition, since the vehicle 1 is in the brake hold state and it is very difficult for the thief to drive and take away the vehicle 1 even if the thief notices the theft prevention control, it is possible to improve the effect of preventing the theft also in this point.

The locking unit 50 is provided for the bypass valve 35 in this example to enable the bypass valve 35 to be kept at the closed state.

An example of the structure of the locking unit 50 and the bypass valve 35 will now be described with reference to FIG. 4 and FIG. 5.

Figure 4:
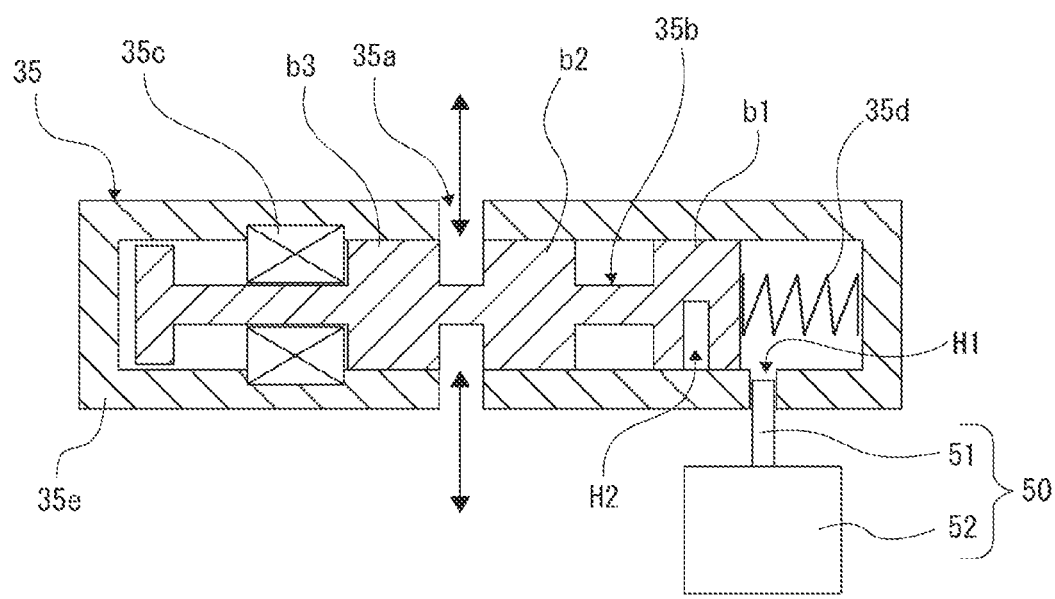
FIG. 4 is a diagram for describing an example of the structure of a locking unit and a bypass valve (a first valve) in the embodiment (when the valve is in an open state)
Figure 5:
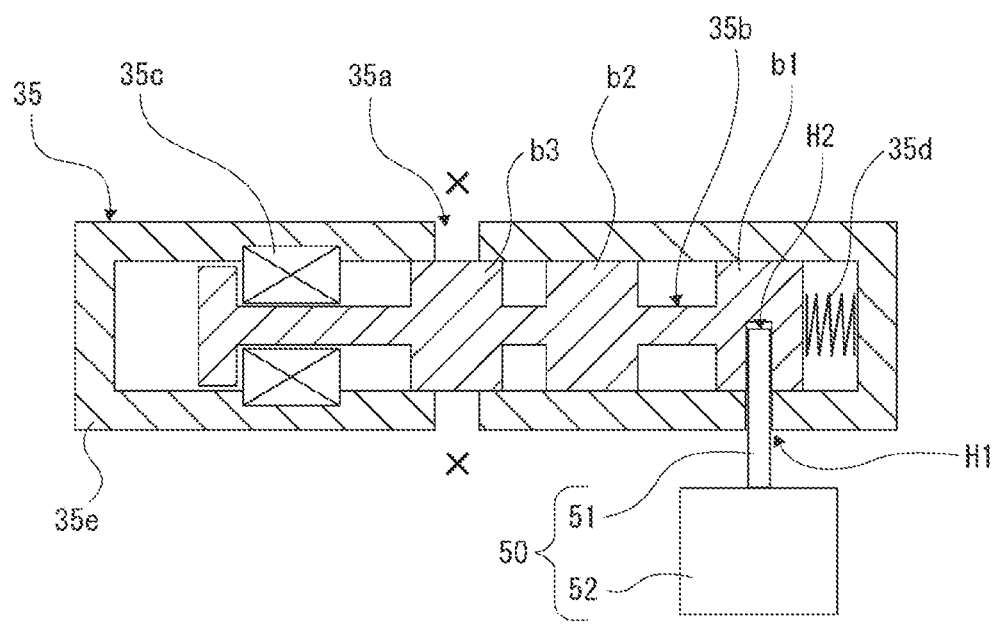
FIG. 5 is a diagram for describing an example of the structure of the locking unit and the bypass valve (the first valve) in the embodiment (when a closed state of the valve is kept)

A cross-sectional structure is illustrated in FIG. 4 and FIG. 5 as the structure of the bypass valve 35.

Although a spool valve is used for the bypass valve 35 in this example, a valve other than the spool valve may be used for the bypass valve 35.

In the bypass valve 35, a spool 35b, an electromagnetic coil 35c, and an urging member 35d are disposed inside a case 35e, which serves as, for example, an outer casing.

The case 35e has a through-hole 35a at a substantially central portion thereof, and a pipe composing a flow path of the brake fluid (a pipe of the eighth flow path L8 in this example: refer to FIG. 2) is connected with both ends of the through-hole 35a.

The spool 35b is formed into a substantially cylindrical shape and has multiple portions having reduced diameters. In the spool 35b, large-diameter portions serve as sliding members (land members) b that slide with being in contact with the inner wall of the case 35e. The spool 35b has three sliding members b in this example, which are denoted by b1, b2, and b3 in FIG. 4 and FIG. 5.

The spool 35b composes a movable member in a solenoid actuator using the electromagnetic coil 35c and is driven in the right direction on the page in response to energization of the electromagnetic coil 35c (refer to transition from FIG. 4 to FIG. 5).

The urging member 35d has urging force in a direction in which the spool 35b is moved in a direction opposite to the driving direction.

The electromagnetic coil 35c is in the de-energized state in FIG. 4. In this state, since the spool 35b is driven to the left side on the page with the urging force of the urging member 35d and the through-hole 35a is not blocked by the sliding members b, as illustrated in FIG. 4, the bypass valve 35 is in the open state. In other words, the bypass valve 35 as the normally-open valve is realized.

In contrast, when the electromagnetic coil 35c is energized, the spool 35b is driven to the right direction on the page against the urging force of the urging member 35d. Since the through-hole 35a is blocked by the sliding member b (the sliding member b3 in this example) in this state, the bypass valve 35 is in the closed state.

The locking unit 50 includes a locking member 51 and a driver 52.

The locking member 51 is a columnar member, such as a substantially cylindrical member or a substantially prismatic member, in this example.

The driver 52 is configured so as to drive the locking member 51 in the axis direction through energization. The driver 52 is driven by the brake control unit 13, which is not illustrated in in FIG. 4 and FIG. 5.

The bypass valve 35 has a hole H1 and a hole H2 to keep the closed state in this example. As illustrated in FIG. 4 and FIG. 5, the hole H1 runs through part of the case 35e and the hole H2 is formed in any of the sliding members b (the sliding member b1 in this example) of the spool 35b.

The locking unit 50 is disposed at a position at which the locking member 51 passes through the hole H1 when the locking member 51 is driven in a direction in which the locking member 51 is projected from the driver 52.

In the bypass valve 35, the hole H2 is formed at a position at which the hole H2 communicates with the hole H1 in a state in which the spool 35b is driven so as to set the bypass valve 35 to the closed state.

When the bypass valve 35 is in the open state, the driving of the locking member 51 by the driver 52 is not performed and the locking member 51 is in a state in which the leading end of the locking member 51 is not inserted into the hole H2, as illustrated in FIG. 4.

In contrast, when the bypass valve 35 is kept at the closed state, the locking member 51 is driven by the driver 52 in the direction in which the locking member 51 is projected from the driver 52. This causes the leading end of the locking member 51 to be inserted into the hole H2 through the hole H1, as illustrated in FIG. 5. As a result, the spool 35b is fixed at a position at which the bypass valve 35 is set to the closed state and the closed state of the bypass valve 35 is kept.

Figure 6A:
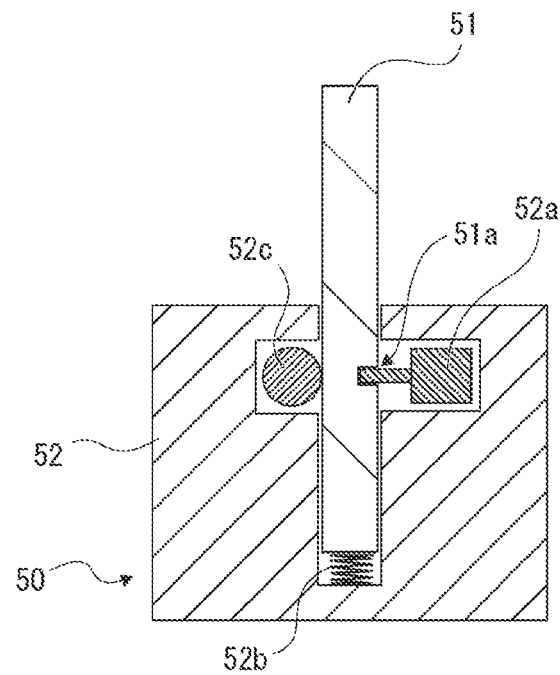
FIG. 6A and FIG. 6B are cross-sectional views for describing an example of the configuration of a driver in the locking unit in the embodiment.
Figure 6B:
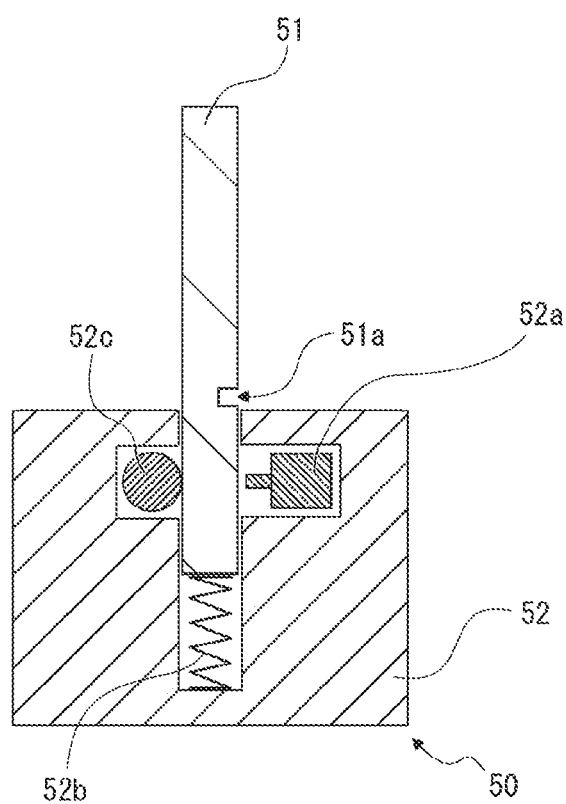

FIG. 6A and FIG. 6B are cross-sectional views for describing an example of the configuration of the driver 52 in the locking unit 50. FIG. 6A illustrates a state before the locking member 51 is driven and FIG. 6B illustrates a state after the locking member 51 is driven.

As illustrated in FIG. 6A and FIG. 6B, the driver 52 includes a first actuator 52a, an urging member 52b, and a second actuator 52c.

In this case, the locking member 51 has a hole 51a.

The first actuator 52a is configured as a solenoid actuator that causes a translational motion of a movable member of, for example, a rod shape.

The urging member 52b urges the locking member 51 in the direction in which the locking member 51 is projected from the driver 52.

In the state before the locking member 51 is driven illustrated in FIG. 6A, the leading end of the movable member of the first actuator 52a is inserted into the hole 51a of the locking member 51 and the locking member 51 is locked in a non-projected state.

In contrast, when the locking member 51 is to be projected from the driver 52 to lock the bypass valve 35, the first actuator 52a is energized to clear the locked state of the locking member 51. In this case, the locking member 51 is driven in the projection direction with the urging force of the urging member 52b. In other words, the locked state of the bypass valve 35 illustrated in FIG. 5 is realized.

In the driver 52, the second actuator 52c is provided as an actuator for retuning the locking member 51, which is in a projected state, to the non-projected state. For example, an actuator as a motor is used as the second actuator 52c. For example, gears rotated by the motor as the second actuator 52c are provided and a lack member to be engaged with the gears is provided on a side face of the locking member 51. This enables the position of the locking member 51 to be returned to the position of the non-projected state against the urging force of the urging member 52b in response to energization of the second actuator 52c.

As described above, the leading end of the movable member of the first actuator 52a is inserted into the hole 51a after the locking member 51 is returned to the position of the non-projected state to enable the locking member 51 to be returned to the state before the locking member 51 is driven illustrated in FIG. 6A.

Adopting, for example, the configuration illustrated in FIG. 6A and FIG. 6B enables the locking unit 50 to be returned again to the state in which the locking of the bypass valve 35 is available after the bypass valve 35 is set to the locked state.

The configuration concerning the keeping of the closed state of the bypass valve 35 described above is an example and the configuration is not limited to the above one.

For example, the number of the sliding members b is not limited to three and at least one sliding member b may be provided. The hole H2 may be provided in any of the sliding members b. The hole H2 is not limitedly provided in the sliding member b and may be provided in a portion other than the sliding members b of the spool 35b.

Also in application to a valve other than the spool valve, a configuration may be adopted in which the member that opens and closes the valve is mechanically locked at a position at which the valve is set to the closed state.

The above configuration for returning the locking unit 50 to the state in which the locking of the bypass valve 35 is available is an example, and another configuration may be adopted to return the locking unit 50 to the state in which the locking of the bypass valve 35 is available.

An example of a specific processing process for realizing the theft prevention control according to the embodiment will now be described with reference to a flowchart illustrated in FIG. 7.

The process illustrated in FIG. 7 is performed by the CPU in the brake control unit 13 in accordance with, for example, a program stored in a storage medium, such as the ROM, in the brake control unit 13.

Referring to FIG. 7, in Step S101, the brake control unit 13 waits for detection of theft. In this example, the brake control unit 13 waits for input of the theft detection signal described above from the theft determination unit 14.

If the theft detection signal is input and the brake control unit 13 determines that theft is detected (YES in Step S101), in Step S102, the brake control unit 13 controls the brake booster 41 so as to make a stroke of the brake pedal 25.

As described above, the brake control unit 13 performs control to make the full-stroke of the brake pedal 25 in the control of the stroke in this example.

In Step S103, the brake control unit 13 performs control to open the pressure reduction valves 38 and 39.

As the result of the above control, the brake fluid pressure occurring in the stroke control in Step S102 is supplied to not only the brake calipers 21 in the brake mechanisms 20 but also the low-pressure chamber 40.

In general, the capacity of the brake fluid in the master cylinder 42 is higher than that in the brake caliper 21 (the fluid pressure chamber in the brake mechanism 20). Accordingly, the supply of the fluid pressure caused by the pedal stroke also to the low-pressure chamber 40 enables the amount of the brake fluid that remains at the master cylinder 42 side after the pedal stroke to be reduced. In other words, it is possible to increase the degree of the brake pedal 25 that does not work well and the brakes are not sharp.

Accordingly, it is possible to increase the possibility of the false recognition of brake failure by the thief and to further reduce the motivation of the thief to take away the vehicle to improve the effect of preventing the theft.

The timing to open the pressure reduction valves 38 and 39 is not limited to a time after the pedal stroke by the brake booster 41. In other words, the order of Step S102 and Step S103 may be reversed.

In Step S104, the brake control unit 13 performs control to close the bypass valve 35.

In Step S105, the brake control unit 13 performs driving control of the locking member 51. In other words, the brake control unit 13 drives the locking member 51 in the projection direction by driving the driver 52 (the first actuator 52a) to keep the bypass valve 35 at the closed state.

This keeps a state in which the brake fluid pressure is discharged in the master cylinder 42 and reduces the reaction force against the pedal force of the brake pedal 25 (in other words, the brake pedal 25 does not work well and the brakes are not so sharp).

In addition, since the applied state of the brake fluid pressure is kept in the brake caliper 21, the vehicle 1 is in the brake hold state.

After Step S105, the series of steps in FIG. 5 are terminated.

For example, when the thief gives up the taking-away of the vehicle 1 and lefts the vehicle 1 after the brake control for theft prevention is activated, returning the vehicle 1 to the state before the brake control for theft prevention is activated is considered. A description of this with reference to the drawing is omitted herein.

In order to achieve this, the locked state (keeping of the closed state) of the bypass valve 35 is to be cleared. In this example, the brake control unit 13 drives the second actuator 52c in the driver 52 to return the locking member 51 to the position of the non-projected state. This returns the bypass valve 35 to the open state with the urging force of the urging member 35d and the brake fluid is capable of being returned to the upstream side (the master cylinder 42 and the reservoir tank 43) via the eighth flow path L8.

As described above, inserting the leading end of the movable member of the first actuator 52a into the hole 51a of the locking member 51 by driving the first actuator 52a enables the vehicle control apparatus 10 to be returned again to the state in which the brake control for theft prevention is available.

As apparent from the above description, the brake control unit 13 is to be energized to realize the theft prevention control according to the embodiment.

Accordingly, if the thief takes measures to unplug a power connector for supplying power to the brake control unit 13 before detection of theft in order avoid the activation of the theft prevention control, the effect of preventing the theft through the theft prevention control is not achieved.

In addition, since the brake booster 41 is also used in the theft prevention control, the effect of preventing the theft through the theft prevention control is not achieved also if measures to unplug a power connector for supplying power to the brake booster 41 is taken.

In order to resolve the above problems, as another example of the present embodiment, a configuration is proposed in which a power supply line to the brake booster 41 and a power supply line to the brake control unit 13 are each duplicated.

The duplication of the power supply lines to the brake booster 41 and the brake control unit 13 enables a state in which the power supply is available to be made with one power supply line, among the duplicated power supply lines, even if the other power connector is unplugged to enable the activation of the theft prevention control.

In the duplication of the power supply lines, it is desirable to device a way that makes difficult to concurrently unplug the two power connectors.

Figure 8:
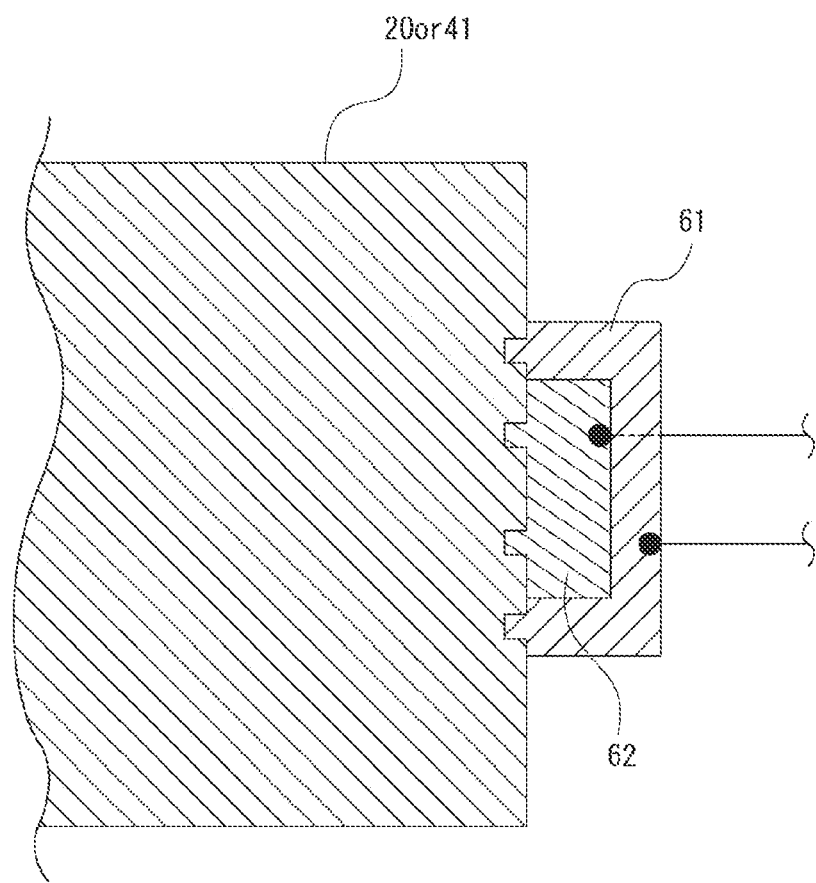
FIG. 8 illustrates an exemplary structure for making it difficult to concurrently unplug two power connectors.

An example of this is illustrated in FIG. 8.

An example of the configuration of a power reception unit in the brake control module 26 including the brake control unit 13 is illustrated in FIG. 8.

For example, as illustrated in FIG. 8, the configuration of the power reception unit is devised so that it is difficult to unplug a power connector 62 of one power supply line, among the duplicated power supply lines, unless a power connector 61 of the other power supply line is unplugged. A configuration is illustrated in the example in FIG. 8 in which the plug positions of the power connector 61 and the power connector 62 are set so that the power connector 62 is covered with the power connector 61 in a state in which the power connector 61 and the power connector 62 are plugged.

In order to make it difficult to concurrently unplug the two power connectors, for example, the plug position of one power connector may be provided at an opposite side of the plug position of the other power connector.

Although the configuration of the power reception unit in the brake control module 26 is described above, the same measures are made for the brake booster 41 side.

FIG. 9 is a flowchart illustrating an example of a processing process to be performed in another example of the present embodiment.

The process illustrated in FIG. 9 is also performed by the CPU in the brake control unit 13 in accordance with, for example, a program stored in a storage medium, such as the ROM, in the brake control unit 13.

In FIG. 9, the same step numbers are added to the same steps as in the process described above with reference to FIG. 7 and a description of such steps is omitted herein.

If the brake control unit 13 determines that theft is not detected (NO in Step S101), in Step S201, the brake control unit 13 determines whether disconnection of one power supply line is detected. In one example, the brake control unit 13 determines whether disconnection of at least one power supply line, among the respective duplicated power supply lines to the brake booster 41 and the brake control unit 13 (the brake control module 26) (that is, at least one power supply line, among the four power supply lines), is detected.

If disconnection of any power supply line is not detected and the condition of detection of disconnection of one power supply line is not met (NO in Step S201), the process goes back to Step S101.

If disconnection of any power supply line is detected and the condition of detection of disconnection of one power supply line is met (YES in Step S201), the process goes to Step S102.

A duplicated description of Step S102 to Step S105 is omitted herein.

The addition of Step S201 enables the theft prevention control to be activated while the power supply is performed using one power connector even if the other power connector is unplugged in the brake booster 41 or the brake control module 26. In other words, the measures against the avoidance of the activation of the theft prevention control is capable of being made by unplugging the power connector of the brake booster 41 or the brake control module 26.

The embodiments are not limited to the examples described above and various modifications are available.

For example, the full-stroke is exemplified as the stroke of the brake pedal 25 by the brake booster 41, the stroke of the brake pedal 25 by the brake booster 41 is not limited to the full-stroke. A stroke of at least predetermined amount of more is to be used as the stroke of the brake pedal 25 by the brake booster 41.

Although the disk brake mechanism is exemplified as the brake mechanisms 20 in the above description, the disclosure is applicable to a case in which a brake mechanism of another form, such as a drum brake mechanism, is adapted.

Although the vehicle 1 is exemplified as the engine vehicle including the engine as the driving source of the wheels, the disclosure is applicable to a hybrid vehicle including both the engine and the motor as the driving sources of the wheels and an electric vehicle including the motor as the driving source of the wheels.

As described above, a vehicle control apparatus (the vehicle control apparatus 10) according to an embodiment is in a vehicle (the vehicle 1) comprising a brake mechanism (the brake mechanism 20). The vehicle control apparatus (the vehicle control apparatus 10) comprises one or more processors (the CPU in the brake control unit 13) and one or more storage media (the ROM in the brake control unit 13) configured to store a program executed by the one or more processors. The program comprises one or more instructions.

The instruction causes the one or more processors to perform a brake control process in which, after a stroke of a predetermined amount or more is made to a brake pedal by a brake booster to apply brake fluid pressure to the brake mechanism in response to input of a certain signal corresponding to detection of theft of the vehicle, the stroke of the brake pedal by the brake booster is cancelled while keeping a fluid pressure applied state to the brake mechanism by keeping a first valve (the bypass valve 35) disposed in a brake fluid pressure circuit at a closed state.

With the above configuration, the vehicle is in the brake hold state and the reaction force against the pedal force of the brake pedal is reduced in response to detection of theft of the vehicle (the brake pedal does not work well and the brakes are not so sharp).

The state in which the reaction force against the pedal force of the brake pedal is reduced may lead false recognition of brake failure by the thief and may reduce the motivation of the thief to take away the vehicle while making it difficult for the thief to notice activation of the theft prevention control to improve the effect of preventing the theft. In addition, since the vehicle is in the brake hold state and it is very difficult for the thief to drive and take away the vehicle even if the thief notices the theft prevention control, it is possible to improve the effect of preventing the theft also in this point.

1) Replacement of the brake control unit that performs the theft prevention control and 2) discharge of the fluid pressure from the brake caliper are supposed as measures to be taken by the thief to clear the brake hold state through the theft prevention control. However, as for 1), since the high-pressure brake fluid is blown out at the moment when the brake control unit is to be removed when the brake control unit is integrally formed to the fluid pressure circuit, it is difficult to replace the brake control unit. As for 2), the brakes do not work when the fluid pressure is discharged from the brake caliper to increase the difficulty to take away the vehicle.

In addition, if the thief gives up the taking-away of the vehicle due to the activation of the theft prevention control and lefts the vehicle, cancelling the theft prevention control enables the vehicle to be appropriately returned to the state before the theft prevention control is activated.

The cancellation of the theft prevention control is desirably performed by a certain organization, for example, a public organization, such as police, or a neutral organization, such as a dealer, using a certain tool.

In the vehicle control apparatus according to the embodiment, a power supply line to the brake booster, which is an electric booster, and a power supply line to a brake control unit (the brake control unit 13) comprising the processor performing the brake control process are respectively duplicated. The brake control process is started under a condition that the certain signal is input or disconnection of one power supply line, among the power supply lines, is recognized (refer to FIG. 9).

With the above configuration, even if the activation of the theft prevention control is to be inhibited by unplugging one power connector of the brake booster or the brake control unit, the state in which the power supply is available is capable of being achieved with the other power supply line, among the duplicated power supply lines, to enable the activation of the theft prevention control.

Accordingly, it is possible to increase the difficulty to inhibit the activation of the theft prevention control to improve the effect of preventing the theft.

In the vehicle control apparatus according to the embodiment, the first valve is a normally-open valve. The vehicle control apparatus further comprises a locking unit configured to lock the first valve to the closed state. In the brake control process, the fluid pressure applied state to the brake mechanism is kept by driving the locking unit to lock the first valve to the closed state.

With the above configuration, even if the brake control unit is powered off after the first valve, which is the normally-open valve, is controlled so as to be in the closed state, it is possible to keep the first valve at the closed state, that is, to keep the brake hold state and keep the state in which brake pedal does not work and the brakes are not so sharp.

Accordingly, it is possible to increase the difficulty to inhibit the activation of the theft prevention control by unplugging the power connector of the brake control unit to improve the effect of preventing the theft.

In the vehicle control apparatus according to the embodiment, in the brake control process, a full-stroke is made to the brake pedal as the stroke of a predetermined amount or more.

With the above configuration, it is possible to realize the strong brake hold state in response to detection of theft of the vehicle.

Accordingly, it is possible to increase the difficulty of the theft to drive and take away the vehicle to improve the effect of preventing the theft.

In the vehicle control apparatus according to the embodiment, a second valve configured to discharge fluid pressure of the brake mechanism to a fluid pressure chamber (the low-pressure chamber 40) is provided downstream of the first valve in the brake fluid pressure circuit. In the brake control process, when a stroke is made to the brake pedal, the second valve is set to an open state to apply fluid pressure from a master cylinder to the fluid pressure chamber.

In general, the capacity of the brake fluid in the master cylinder is higher than that in the fluid pressure chamber in the brake mechanism. Accordingly, the supply of the fluid pressure caused by the pedal stroke also to the fluid pressure chamber enables the amount of the brake fluid that remains at the master cylinder side after the pedal stroke to be reduced. In other words, it is possible to increase the degree of the brake pedal that does not work well and the brakes are not sharp.

Accordingly, it is possible to increase the possibility of the false recognition of brake failure by the thief and to further reduce the motivation of the thief to take away the vehicle to improve the effect of preventing the theft.

The vehicle control apparatus 10 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the vehicle control apparatus 10 including the key system control unit 11, the engine control unit 12, the brake control unit 13, and the theft determination unit 14. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A vehicle control apparatus for a vehicle, the vehicle comprising a brake mechanism, the vehicle control apparatus comprising:
   one or more processors; and
   one or more storage media storing a program to be executed by the one or more processors,
   wherein the program comprises one or more instructions, and
   wherein the one or more instructions cause the one or more processors to perform a brake control process in which, after a stroke of a predetermined amount or more is made to a brake pedal by a brake booster to apply brake fluid pressure to the brake mechanism to make the brake fluid pressure in a pressurized state in response to input of a predetermined signal corresponding to detection of theft of the vehicle, the stroke of the brake pedal by the brake booster is cancelled while a first valve disposed in a brake fluid pressure circuit is kept at a closed state to keep the pressurized state of the brake fluid pressure applied to the brake mechanism.

2. The vehicle control apparatus according to claim 1,
   wherein the brake booster is an electric booster, and
   wherein a power supply line to the brake booster and a power supply line to a brake control unit comprising one of the one or more processors performing the brake control process are respectively redundant, and
   wherein the brake control process is started under a condition that the predetermined signal is input or disconnection of one of the power supply lines is recognized.

3. The vehicle control apparatus according to claim 1, further comprising:
   a locking unit configured to lock the first valve to the closed state,
   wherein the first valve is a normally-open valve,
   wherein, in the brake control process, the locking unit is driven to lock the first valve to the closed state to keep the pressurized state for the brake mechanism.

4. The vehicle control apparatus according to claim 2, further comprising:
   a locking unit configured to lock the first valve to the closed state,
   wherein the first valve is a normally-open valve,
   wherein, in the brake control process, the locking unit is driven to lock the first valve to the closed state to keep the pressurized state for the brake mechanism.

5. The vehicle control apparatus according to claim 1,
   wherein, in the brake control process, a full-stroke is made to the brake pedal as the stroke of the predetermined amount or more.

6. The vehicle control apparatus according to claim 2,
   wherein, in the brake control process, a full-stroke is made to the brake pedal as the stroke of the predetermined amount or more.

7. The vehicle control apparatus according to claim 3,
   wherein, in the brake control process, a full-stroke is made to the brake pedal as the stroke of the predetermined amount or more.

8. The vehicle control apparatus according to claim 4,
   wherein, in the brake control process, a full-stroke is made to the brake pedal as the stroke of the predetermined amount or more.

9. The vehicle control apparatus according to claim 1,
   wherein a second valve configured to discharge fluid pressure of the brake mechanism to a fluid pressure chamber is provided downstream of the first valve in the brake fluid pressure circuit, and
   wherein, in the brake control process, when the stroke is made to the brake pedal, the second valve is set to an open state to apply fluid pressure from a master cylinder to the fluid pressure chamber.

10. The vehicle control apparatus according to claim 2,
    wherein a second valve configured to discharge fluid pressure of the brake mechanism to a fluid pressure chamber is provided downstream of the first valve in the brake fluid pressure circuit, and
    wherein, in the brake control process, when the stroke is made to the brake pedal, the second valve is set to an open state to apply fluid pressure from a master cylinder to the fluid pressure chamber.

11. The vehicle control apparatus according to claim 3,
    wherein a second valve configured to discharge fluid pressure of the brake mechanism to a fluid pressure chamber is provided downstream of the first valve in the brake fluid pressure circuit, and
    wherein, in the brake control process, when the stroke is made to the brake pedal, the second valve is set to an open state to apply fluid pressure from a master cylinder to the fluid pressure chamber.

12. The vehicle control apparatus according to claim 4,
    wherein a second valve configured to discharge fluid pressure of the brake mechanism to a fluid pressure chamber is provided downstream of the first valve in the brake fluid pressure circuit, and
    wherein, in the brake control process, when the stroke is made to the brake pedal, the second valve is set to an open state to apply fluid pressure from a master cylinder to the fluid pressure chamber.

13. The vehicle control apparatus according to claim 5,
    wherein a second valve configured to discharge fluid pressure of the brake mechanism to a fluid pressure chamber is provided downstream of the first valve in the brake fluid pressure circuit, and
    wherein, in the brake control process, when the stroke is made to the brake pedal, the second valve is set to an open state to apply fluid pressure from a master cylinder to the fluid pressure chamber.

14. The vehicle control apparatus according to claim 6,
    wherein a second valve configured to discharge fluid pressure of the brake mechanism to a fluid pressure chamber is provided downstream of the first valve in the brake fluid pressure circuit, and
    wherein, in the brake control process, when the stroke is made to the brake pedal, the second valve is set to an open state to apply fluid pressure from a master cylinder to the fluid pressure chamber.

15. The vehicle control apparatus according to claim 7,
    wherein a second valve configured to discharge fluid pressure of the brake mechanism to a fluid pressure chamber is provided downstream of the first valve in the brake fluid pressure circuit, and
    wherein, in the brake control process, when the stroke is made to the brake pedal, the second valve is set to an open state to apply fluid pressure from a master cylinder to the fluid pressure chamber.

16. The vehicle control apparatus according to claim 8,
    wherein a second valve configured to discharge fluid pressure of the brake mechanism to a fluid pressure chamber is provided downstream of the first valve in the brake fluid pressure circuit, and wherein, in the brake control process, when the stroke is made to the brake pedal, the second valve is set to an open state to apply fluid pressure from a master cylinder to the fluid pressure chamber.

\* \* \* \* \*